United States Patent
Gao et al.

(10) Patent No.: US 11,510,203 B2
(45) Date of Patent: Nov. 22, 2022

(54) METHOD AND APPARATUS FOR DETERMINING UPLINK TRANSMISSION BEAM

(71) Applicant: CHINA ACADEMY OF TELECOMMUNICATIONS TECHNOLOGY, Beijing (CN)

(72) Inventors: Qiubin Gao, Beijing (CN); Rakesh Tamrakar, Beijing (CN); Xin Su, Beijing (CN); Runhua Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 181 days.

(21) Appl. No.: 16/494,647

(22) PCT Filed: Feb. 26, 2018

(86) PCT No.: PCT/CN2018/077259
§ 371 (c)(1),
(2) Date: Sep. 16, 2019

(87) PCT Pub. No.: WO2018/166345
PCT Pub. Date: Sep. 20, 2018

(65) Prior Publication Data
US 2021/0120536 A1    Apr. 22, 2021

(30) Foreign Application Priority Data
Mar. 17, 2017  (CN) .......................... 201710161447.0

(51) Int. Cl.
*H04W 72/04*    (2009.01)
*H04W 72/12*    (2009.01)

(52) U.S. Cl.
CPC ..... *H04W 72/046* (2013.01); *H04W 72/1268* (2013.01); *H04W 72/1289* (2013.01)

(58) Field of Classification Search
CPC ............ H04W 72/046; H04W 72/1289; H04W 72/1268
See application file for complete search history.

(56) References Cited

U.S. PATENT DOCUMENTS 10,498,511 B2 * 12/2019 Qin ...................... H04L 5/0048
10,873,946 B2 * 12/2020 Seo ...................... H04L 5/0082
(Continued)

FOREIGN PATENT DOCUMENTS

CN    101686110 A    3/2010
CN    102754476 A    10/2012
(Continued)

OTHER PUBLICATIONS

3GPP TSG RAN WG1 Meeting #87, R1-1612058, Reno, Nevada, USA, Nov. 14-18, 2016, Agenda Item: 7.1.3.3, Source: Qualcomm Incorporated, Title: Beam Reciprocity Aspects, Document for: Discussion.
(Continued)

*Primary Examiner* — Brenda H Pham
(74) *Attorney, Agent, or Firm* — Harness, Dickey & Pierce, P.L.C.

(57) ABSTRACT

A method and an apparatus for determining an uplink transmission beam are provided. The method includes: a base station transmitting uplink transmission beam indication information to a terminal; where the uplink transmission beam indication information includes beam type indication information, the beam type indication information is used to indicate that the uplink transmission beam for the terminal is obtained based on uplink reference signals, or the beam type indication information is used to indicate that the uplink
(Continued)

```
┌─────────────────────────────────────────────────────────────┐
│  a terminal receiving uplink transmission beam indication   │
│  information transmitted by a base station, where the       │── 501
│  uplink transmission beam indication information includes   │
│  beam type indication information, the beam type indication │
│  information is used to indicate that the uplink            │
│  transmission beam for the terminal is obtained based on    │
│  uplink reference signals, or the beam type indication      │
│  information is used to indicate that the uplink            │
│  transmission beam for the terminal is obtained based on    │
│  downlink reference signals                                 │
└─────────────────────────────────────────────────────────────┘
                              │
                              ▼                                502
┌─────────────────────────────────────────────────────────────┐
│  the terminal determining the uplink transmission beam      │
│  based on the uplink transmission beam indication           │
│  information                                                │
└─────────────────────────────────────────────────────────────┘
``` transmission beam for the terminal is obtained based on downlink reference signals, so as to ensure that the base station is capable of selecting an uplink transmission beam for the terminal.

20 Claims, 6 Drawing Sheets

(56) References Cited

U.S. PATENT DOCUMENTS

| | | | |
|---|---|---|---|
| 2011/0211487 A1* | 9/2011 | Han | H04W 16/28 370/252 |
| 2013/0040684 A1 | 2/2013 | Yu et al. | |
| 2013/0102345 A1* | 4/2013 | Jung | H04W 72/02 455/513 |
| 2013/0258885 A1* | 10/2013 | Yu | H04W 74/08 370/252 |
| 2014/0003240 A1 | 1/2014 | Chen et al. | |
| 2015/0208443 A1* | 7/2015 | Jung | H04W 56/001 370/329 |
| 2016/0345216 A1 | 11/2016 | Kishiyama et al. | |
| 2016/0352403 A1 | 12/2016 | Kishiyama et al. | |
| 2017/0033851 A1 | 2/2017 | Zhong et al. | |
| 2017/0134964 A1* | 5/2017 | Yu | H04L 5/0055 |
| 2018/0102827 A1* | 4/2018 | Noh | H04B 7/0404 |
| 2018/0198657 A1* | 7/2018 | Aiba | H04W 28/18 |
| 2018/0234959 A1* | 8/2018 | Ahn | H04W 72/042 |
| 2019/0104477 A1* | 4/2019 | MolavianJazi | H04B 7/088 |
| 2019/0132850 A1* | 5/2019 | Sun | H04W 72/005 |

FOREIGN PATENT DOCUMENTS

| | | | |
|---|---|---|---|
| CN | 103220024 A | | 7/2013 |
| CN | 104205911 A | | 12/2014 |
| CN | 104734759 A | | 6/2015 |
| CN | 105940699 A | * | 9/2016 ........... H04B 7/0413 |
| CN | 105940699 A | | 9/2016 |
| CN | 106027181 A | | 10/2016 |
| JP | 2014529213 A | | 10/2014 |
| JP | 2015164281 A | | 9/2015 |
| WO | 2017214969 A1 | | 12/2017 |

OTHER PUBLICATIONS

3GPP TSG-RAN WG2 Meeting #96, R2-168207, Reno, USA, Nov. 14-18, 2016, Agenda Item: 9.3.1.1.2, Source: ASUSTeK, Title: Beam management in NR, Document for: Discussion and Decision.

The Japan Patent Office, First Office Action, Application No. 2019-551400, dated Nov. 25, 2020, Applicant: China Academy of Telecommunications Technology.

3GPP TSG RAN WG1 Meeting 88, R1-1701804, Feb. 13-17, 2017, Athens, GR, Agenda Item: 8.1.2.2.3, Source: ZTE Microelectronics, Title: UL Beam Management, Document For: Discussion and Decision.

3GPP TSG RAN WG1 Meeting 88, R1-1702941, Feb. 13-17, 2017, Athens, GR, Agenda Item: 8.1.2.2.3, Source: Samsung, Title: Discussion on Beam Correspondence, Document For: Discussion and Decision.

3GPP TSG RAN WG1 Meeting 88, R1-1702942, Feb. 13-17, 2017, Athens, GR, Agenda Item: 8.1.2.2.3, Source: Samsung, Title: UL Beam Management Procedures, Document For: Discussion.

3GPP TSG RAN WG1 Meeting 88, R1-1703133, Feb. 13-17, 2017, Athens, GR, Agenda Item: 8.1.2.2.3, Source: Sony, Title: Joint DL/UL Beam Management Operation for NR, Document For: Discussion.

3GPP TSG RAN WG1 Meeting 88, R1-1703183, Feb. 13-17, 2017, Athens, GR, Agenda Item: 8.1.2.4.4, Source: Nokia, Alcatel-Lucent Shanghai Bell, Title: UL SRS Design Considerations in NR, Document For: Discussion and Decision.

3GPP TSG RAN WG1 Meeting 88, R1-1703227, Feb. 13-17, 2017, Athens, GR, Agenda Item: 8.1.2.2.3, Source: Ericsson, Title: On UL Beam Management, Document For: Discussion and Decision.

Patent Cooperation Treaty, Advance E-Mail PCT, Date of Mailing: Sep. 26, 2019, PCT/CN2018/077259, Applicant: China Academy of Telecommunications Technology.

The State Intellectual Property Office of People's Republic of China, Applicant: China Academy of Telecommunications Technology, Title of Invention: Method and Device for Determining Uplink Transmission Beam, First Office Action, Publication Date: Nov. 18, 2016.

European Patent Office, Munich, Germany, dated Jan. 29, 2020, PCT/CN2018077259, China Academy of Telecommunications Technology, Communication, Extended European Search Report.

3GPP TSG RAN WG1 #88, R1-1702200, Athens, Greece, Feb. 13-17, 2017, Source: Intel Corporation, Title: On Beam Indication On Control and Data Channel, Agenda Item: 8.1.2.2.1, Document For: Discussion and Decision.

3GPP TSG RAN WG1#88, R1-1703160, Athens, Greece, Feb. 13-17, 2017, Agenda Item: 8.1.2.2.1, Source: Nokia, Alcatel-Lucent Shanghai Bell, Title: On Beam Grouping Reporting in NR, Document For: Discussion and Decision.

* cited by examiner a base station transmitting uplink transmission beam indication information to a terminal; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals — 401

Fig. 4 a terminal receiving uplink transmission beam indication information transmitted by a base station, where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals — 501 the terminal determining the uplink transmission beam based on the uplink transmission beam indication information — 502

Fig. 5

METHOD AND APPARATUS FOR DETERMINING UPLINK TRANSMISSION BEAM

CROSS-REFERENCE TO RELATED APPLICATION

The present application is the U.S. national phase of PCT Application No. PCT/CN2018/077259 filed on Feb. 26, 2018, which claims a priority of the Chinese patent application No. 201710161447.0 filed on Mar. 17, 2017, disclosures of which are incorporated herein by reference in their entireties.

TECHNICAL FIELD

The present disclosure relates to the field of communication technology, in particular to a method and an apparatus for determining an uplink transmission beam.

BACKGROUND

In view of significant advantages of the Multiple-Input Multiple-Output (MIMO) technology in improving peak rate and system spectrum utilization, wireless access technical standards such as Long Term Evolution (LTE) or LTE-Advanced (LTE-A) are established on the basis of MIMO and Orthogonal Frequency Division Multiplexing (OFDM) technologies. The performance gains of the MIMO technology derive from the spatial freedom available to the multi-antenna system, thus a most significant evolving trend in the standardization process of the MIMO technology is the dimension expansion.

The LTE Rel-8 supports up to four layers of MIMO transmission. The Rel-9 focuses on the enhancement of the Multi-User MIMO (MU-MIMO) technology, and up to four downlink data layers may be supported in the MU-MIMO transmission in Transmission Mode (TM)-8. The Rel-10 introduces the support for eight antenna ports, which further improves the spatial resolution of the channel state information, and expands the transmission capacity of the Single-User MIMO (SU-MIMO) to up to eight data layers. The Rel-13 and Rel-14 introduce the Full Dimensional MIMO (FD-MIMO) technology to support up to 32 ports, thereby achieving full dimensional and vertical beamforming.

In order to further enhance the MIMO technology, the Massive MIMO technique is introduced in mobile communication systems. For a base station, fully digitized Massive MIMO antennas may have up to 128/256/512 antenna units and up to 128/256/512 transceiver units, where each antenna unit is connected to one transceiver unit. 128/256/512 pilot signals are transmitted through respective antenna ports, and the terminal measures the channel state information and feeds it back. For a terminal, an antenna array with up to 32/64 antenna units may be provided. Through the beamforming in both the base station and the terminal, tremendous beamforming gains may be obtained to compensate for the signal fading resulting from path losses. Especially for communications in a high frequency band, e.g., at 30 GHz frequency point, the path losses render the radio signal coverage quite limited. With the aid of the Massive MIMO, the radio signal coverage may be expanded to a practical extent.

In a fully digitized antenna array, each antenna unit is provided with a respective transceiver unit, which increases the size, cost and power consumption of the equipment dramatically. This is especially true in consideration of the Analog-to-Digital Converter (ADC) and the Digital-to-Analog Converter (DAC) of the transceiver unit, since the ADC/DAC has experienced a power consumption reduction of merely 1/10 and very limited performance improvement over the last decade. In order to reduce the size, cost and power consumption of the equipment, technical solutions based on the analog beamforming are proposed. In the related art, the terminal may obtain an uplink transmission beam from an uplink beam training process or based on the uplink-downlink beam reciprocity; however, the terminal may not determine the uplink transmission beam in accordance with instructions of the base station.

SUMMARY

In view of the technical problem described above, embodiments of the present disclosure provide a method and an apparatus for determining an uplink transmission beam, so as to ensure that the base station is capable of selecting an uplink transmission beam for the terminal.

According to a first aspect of embodiments of the present disclosure, a method for determining an uplink transmission beam is provided. The method includes: transmitting, by a base station, uplink transmission beam indication information to a terminal, where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

Optionally, in the case that the base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes an index of a downlink transmission beam, indication information of the downlink reference signals or indication information of a downlink reception beam.

Optionally, before transmitting, by the base station, the uplink transmission beam indication information to the terminal, the method further includes: determining, by the base station, the uplink transmission beam for the terminal based on the uplink reference signals, or determining, by the base station, the uplink transmission beam for the terminal based on an uplink-downlink beam reciprocity.

Optionally, the determining, by the base station, the uplink transmission beam for the terminal based on the uplink reference signals includes: receiving, by the base station, the uplink reference signals transmitted by the terminal through a plurality of candidate uplink transmission beams; and determining, by the base station, an optimal uplink transmission beam on the basis of the uplink reference signals.

Optionally, the uplink reference signal corresponding to each of the plurality of candidate uplink transmission beams is beamformed by using a beamforming weight corresponding to the candidate uplink transmission beam, and the beamformed uplink reference signal is transmitted.

Optionally, the uplink reference signals of the terminal are transmitted on resources configured by the base station.

Optionally, before determining, by the base station, the uplink transmission beam indication information to the terminal, the method further includes: determining, by the base station, the beam type indication information based on a measurement result of the base station; or determining the beam type indication information based on the measurement result of the base station and a measurement result reported by the terminal.

Optionally, the determining, by the base station, the beam type indication information based on the measurement result of the base station includes: measuring, by the base station, uplink reference signals transmitted by the terminal to obtain a reception quality of each of the uplink reference signals; measuring, by the base station, an uplink signal transmitted by the terminal to obtain a reception quality of the uplink signal, where the uplink signal is transmitted by the terminal using the uplink transmission beam obtained based on the downlink reference signals; and in the case that the reception quality of at least one of the uplink reference signals is superior to the reception quality of the uplink signal, selecting, by the base station, to instruct the terminal to obtain the uplink transmission beam based on the uplink reference signals; otherwise, the base station selecting to instruct the terminal to obtain the uplink transmission beam based on the downlink reference signals.

Optionally, the determining, by the base station, the beam type indication information based on the measurement result of the base station and the measurement result reported by the terminal includes: measuring, by the base station, uplink reference signals transmitted by the terminal to obtain a reception quality of each of the uplink reference signals; receiving, by the base station, reception qualities of the downlink reference signals reported by the terminal; in the case that the reception quality of at least one of the uplink reference signals is superior to all the reception qualities of the downlink reference signals reported by the terminal, selecting, by the base station, to instruct the terminal to obtain the uplink transmission beam based on the uplink reference signals; and in the case that the reception quality of at least one of the downlink reference signals reported by the terminal is superior to all the reception qualities of the uplink reference signals, selecting, by the base station, to instruct the terminal to obtain the uplink transmission beam based on the downlink reference signals.

Optionally, the method further includes: receiving, by the base station, an uplink signal that is transmitted by the terminal using a determined uplink transmission beam.

Optionally, the receiving, by the base station, the uplink signal that is transmitted by the terminal using the determined uplink transmission beam includes: in the case that the base station indicates that the terminal obtains the uplink transmission beam based on the uplink reference signals, receiving, by the base station, the uplink signal from the terminal using an uplink reception beam corresponding to the uplink transmission beam indicated by the base station; or in the case that the base station indicates that the terminal obtains the uplink transmission beam based on the downlink reference signals, receiving, by the base station, the uplink signal from the terminal using an uplink reception beam corresponding to the downlink transmission beam indicated by the base station.

According to a second aspect of embodiments of the present disclosure, a method for determining an uplink transmission beam is further provided. The method includes: receiving, by a terminal, uplink transmission beam indication information transmitted by a base station; and determining, by the terminal, the uplink transmission beam based on the uplink transmission beam indication information; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

Optionally, in the case that the base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes an index of a downlink transmission beam, indication information of the downlink reference signals or indication information of a downlink reception beam.

Optionally, the method further includes: determining, by the terminal, a weight of the uplink transmission beam on the basis of the index of the uplink transmission beam or the indication information of the uplink reference signals, in the case that the uplink transmission beam indication information indicates that the terminal obtains the uplink transmission beam based on the uplink reference signals.

Optionally, the terminal determines the weight of the uplink transmission beam on the basis of a mapping relation between the index of the uplink transmission beam and a beamforming weight.

Optionally, the method further includes: determining, by the terminal, a weight of the uplink transmission beam on the basis of an index of a downlink transmission beam or indication information of the downlink reference signals, in the case that the uplink transmission beam indication information indicates that the terminal obtains the uplink transmission beam based on the downlink reference signals.

Optionally, the determining, by the terminal, the weight of the uplink transmission beam on the basis of the index of the downlink transmission beam or the indication information of the downlink reference signals includes: determining, by the terminal, a corresponding downlink reception beam on the basis of the index of the downlink transmission beam or the indication information of the downlink reference signals; and determining, based on a channel reciprocity, the weight of the uplink transmission beam from the downlink reception beam.

According to a third aspect of embodiments of the present disclosure, an apparatus for determining an uplink transmission beam is further provided. The apparatus includes: a transmission module, configured to transmit uplink transmission beam indication information to a terminal; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

Optionally, in the case that a base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes an index of a downlink transmission beam, indication information of the downlink reference signals or indication information of a downlink reception beam.

Optionally, the apparatus further includes: a first determination module, configured to determine the uplink transmission beam for the terminal based on the uplink reference signals, or determine the uplink transmission beam for the terminal based on an uplink-downlink beam reciprocity.

Optionally, the first determination module includes: a receiver unit, configured to receive the uplink reference signals transmitted by the terminal through a plurality of candidate uplink transmission beams; and a first determination unit, configured to determine an optimal uplink transmission beam on the basis of the uplink reference signals.

Optionally, the uplink reference signal of each of the plurality of candidate uplink transmission beams is transmitted after a beamforming using a beamforming weight corresponding to the candidate uplink transmission beam is performed on the uplink reference signal.

Optionally, the apparatus further includes: a second determination module, configured to determine the beam type indication information based on a measurement result of a base station, or determine the beam type indication information based on the measurement result of the base station and a measurement result reported by the terminal.

Optionally, the second determination module includes: a first measurement unit, configured to measure uplink reference signals transmitted by the terminal to obtain a reception quality of each of the uplink reference signals; a second measurement unit, configured to measure an uplink signal transmitted by the terminal to obtain a reception quality of the uplink signal, where the uplink signal is transmitted by the terminal using the uplink transmission beam obtained based on the downlink reference signals; and a first selection unit, configured to, in the case that the reception quality of at least one of the uplink reference signals is superior to the reception quality of the uplink signal, select to instruct the terminal to obtain the uplink transmission beam based on the uplink reference signals; otherwise, select to instruct the terminal to obtain the uplink transmission beam based on the downlink reference signals.

Optionally, the second determination module includes: a third measurement unit, configured to measure uplink reference signals transmitted by the terminal to obtain a reception quality of each of the uplink reference signals; a first receiver unit, configured to receive reception qualities of the downlink reference signals reported by the terminal; and a second selection unit, configured to, in the case that the reception quality of at least one of the uplink reference signals is superior to all the reception qualities of the downlink reference signals reported by the terminal, select to instruct the terminal to obtain the uplink transmission beam based on the uplink reference signals; and in the case that the reception quality of at least one of the downlink reference signals reported by the terminal is superior to all the reception qualities of the uplink reference signals, select to instruct the terminal to obtain the uplink transmission beam based on the downlink reference signals.

Optionally, the apparatus further includes: a first receiver module, configured to receive an uplink signal that is transmitted by the terminal using a determined uplink transmission beam.

Optionally, the first receiver module includes: a second receiver unit, configured to, in the case that it is indicated that the terminal obtains the uplink transmission beam based on the uplink reference signals, receive the uplink signal from the terminal using an uplink reception beam corresponding to the uplink transmission beam indicated; or in the case that it is indicated that the terminal obtains the uplink transmission beam based on the downlink reference signals, receive the uplink signal from the terminal using an uplink reception beam corresponding to the downlink transmission beam indicated.

According to a fourth aspect of embodiments of the present disclosure, an apparatus for determining an uplink transmission beam is further provided. The apparatus includes: a second receiver module, configured to receive uplink transmission beam indication information transmitted by a base station; a third determination module, configured to determine the uplink transmission beam based on the uplink transmission beam indication information; where the uplink transmission beam indication information includes beam type indication information, the beam type indication information is used to indicate that the uplink transmission beam of a terminal is obtained based on uplink reference signals, or the beam type indication information is used to indicate that the uplink transmission beam for the terminal is obtained based on downlink reference signals.

Optionally, in the case that the base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes an index of a downlink transmission beam, indication information of the downlink reference signals or indication information of a downlink reception beam.

Optionally, the apparatus further includes: a fourth determination module, configured to, in the case that the uplink transmission beam indication information indicates that the terminal obtains the uplink transmission beam based on the uplink reference signals, determine a weight of the uplink transmission beam on the basis of the index of the uplink transmission beam or the indication information of the uplink reference signals.

Optionally, the fourth determination module is further configured to determine the weight of the uplink transmission beam on the basis of a mapping relation between the index of the uplink transmission beam and a beamforming weight.

Optionally, the apparatus further includes: a fifth determination module, configured to, in the case that the uplink transmission beam indication information indicates that the terminal obtains the uplink transmission beam based on the downlink reference signals, determine a weight of the uplink transmission beam on the basis of an index of a downlink transmission beam or indication information of the downlink reference signals.

Optionally, the fifth determination module includes: a second determination unit, configured to determine a corresponding downlink reception beam on the basis of the index of the downlink transmission beam or the indication information of the downlink reference signals; and a third determination unit, configured to determine, based on a channel reciprocity, the weight of the uplink transmission beam from the downlink reception beam.

According to a fifth aspect of embodiments of the present disclosure, a base station is further provided. The base station includes a first memory, a first processor and a computer program stored on the first memory and configured to be executed by the first processor, where the first processor is configured to execute the computer program to implement steps of the method for determining an uplink transmission beam as described in the first aspect.

According to a sixth aspect of embodiments of the present disclosure, a terminal is further provided. The terminal includes a second memory, a second processor and a computer program stored on the second memory and configured to be executed by the second processor, where the second processor is configured to execute the computer program to implement steps of the method for determining an uplink transmission beam as described in the second aspect.

According to a seventh aspect of embodiments of the present disclosure, a computer readable storage medium storing therein a computer program is further provided, where the computer program is configured to be executed by a processor, to implement steps of the method for determining an uplink transmission beam as described in the first aspect.

According to an eighth aspect of embodiments of the present disclosure, a computer readable storage medium storing therein a computer program is further provided, where the computer program is configured to be executed by a processor, to implement steps of the method for determining an uplink transmission beam as described in the second aspect.

Any one of the above mentioned technical solutions has advantage or beneficial effect as follows: by indicating, with beam type indication information, whether the uplink transmission beam for the terminal is obtained based on uplink reference signals or downlink reference signals, it is ensured that the base station is capable of selecting an uplink transmission beam for the terminal.

BRIEF DESCRIPTION OF THE DRAWINGS

FIG. 4 is a flow chart of a method for determining an uplink transmission beam according to some embodiments of the present disclosure;

FIG. 5 is a flow chart of a method for determining an uplink transmission beam according to other embodiments of the present disclosure;

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thoroughly understood, and will fully convey the scope of the present disclosure to those skilled in the art.

Figure 1:
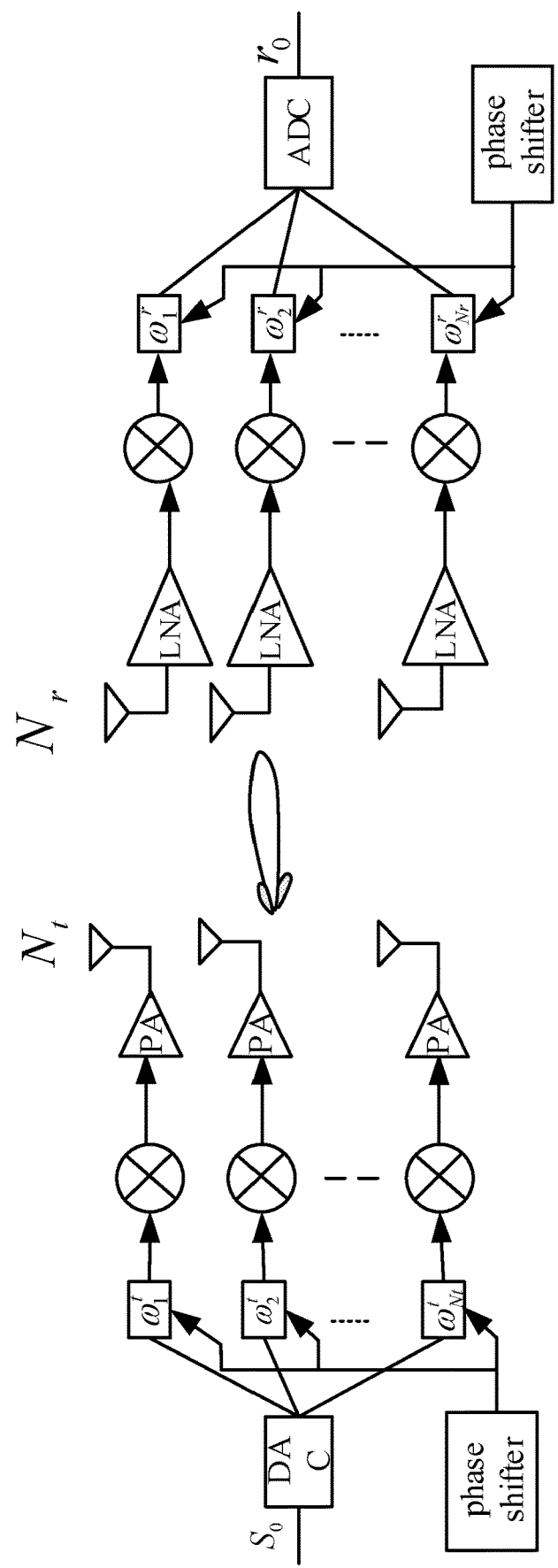
FIG. 1 is a schematic diagram of an analog beamforming (weighted beamforming of Intermediate Frequency signals)
Figure 2:
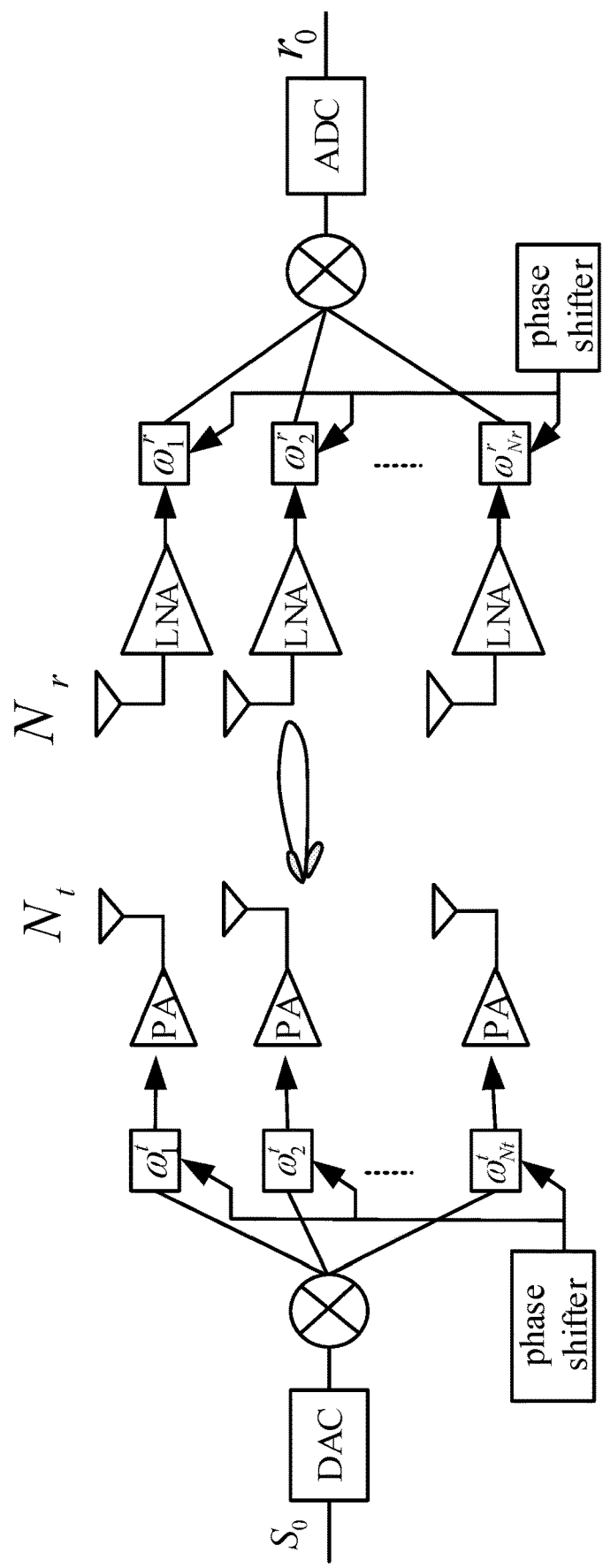
FIG. 2 is a schematic diagram of an analog beamforming (weighted beamforming of Radio Frequency signals)

As shown in FIG. 1 and FIG. 2, a major feature of the analog beamforming is to perform weighted beamforming on the Intermediate Frequency (FIG. 1) or Radio Frequency (FIG. 2) signals by means of a phase shifter. An Advantage thereof consists in that all transmission (reception) antennas share one transceiver unit, thereby achieving simplicity and reducing the size, cost and power consumption of equipment.

Referring to FIG. 4, a flow of a method for determining an uplink transmission beam is illustrated. The method is applicable to a base station and includes the following step 401: a base station transmitting uplink transmission beam indication information to a terminal; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

In R9, four types of reference signals are defined for the downlink, which are: Cell-specific Reference Signal (C-RS), UE-specific Reference Signal (UE-RS, aka DM-RS), Multicast/Broadcast over a Single Frequency Network (MBSFN) reference signal and Positioning Reference Signal (P-RS). In R10, five types of reference signals are defined for the downlink, which are: Cell-specific Reference Signal (C-RS), UE-specific Reference Signal (UE-RS, aka DM-RS), Multicast/Broadcast over a Single Frequency Network (MBSFN) reference signal, Positioning Reference Signal (P-RS) and Channel State Information Reference Signal (CSI-RS). Uplink reference signals may include DM-RS and Sounding Reference Signal (SRS).

In the present embodiment, the aforementioned uplink transmission beam may be obtained from an uplink beam training process.

In the present embodiment, the uplink transmission beam for the terminal may be obtained based on reciprocity between an uplink channel and a downlink channel. In a Time Division Duplex (TDD) system, the uplink and downlink channels in the same frequency band have basically the same characteristics within certain coherence time, which is called channel reciprocity. For example, in a Time Division Long Term Evolution (TD-LTE) system, the uplink and downlink transmissions are performed on the same frequency resource and in different time slots, therefore it may be assumed that the uplink and downlink transmission signals experience the same channel fading within a relatively short time (the coherence time of channel propagation), which is the channel reciprocity of the TD-LTE system.

It is noted that, in the present embodiment, the beam type indication information is used to indicate whether the uplink transmission beam for the terminal is obtained based on uplink reference signals or downlink reference signals.

In an present embodiment, the base station may indicate, with beam type indication information, that the terminal uses the uplink transmission beam obtained based on uplink reference signals, or the base station may indicate, with beam type indication information, that the terminal uses the uplink transmission beam obtained based on downlink reference signals, thereby it is ensured that the base station selects an uplink transmission beam for the terminal.

In the case that the base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes an index of a downlink transmission beam, indication information of the downlink reference signals or indication information of a downlink reception beam.

In an embodiment, optionally, prior to determining, by the base station, the uplink transmission beam indication information to the terminal, the base station may determine the uplink transmission beam for the terminal in one of two modes as follows: mode 1, the base station determining the uplink transmission beam for the terminal based on the uplink reference signals; and mode 2, the base station determining the uplink transmission beam for the terminal based on an uplink-downlink channel reciprocity.

The mode 1 includes specifically: the base station receiving the uplink reference signals transmitted by the terminal through a plurality of candidate uplink transmission beams; then the base station determining an optimal uplink transmission beam on the basis of the uplink reference signals. For example, the base station determines the optimal uplink transmission beam by measuring the uplink reference signals, such that the base station is capable of selecting an appropriate uplink transmission beam for the terminal.

The uplink reference signal of each of the plurality of candidate uplink transmission beams is transmitted after a beamforming using a beamforming weight corresponding to the candidate uplink transmission beam is performed on the uplink reference signal.

The uplink reference signals of the terminal are transmitted on resources configured by the base station. For example, the resources configured may be periodic resources, non-periodic resources or semi-persistent resources.

Figure 3:
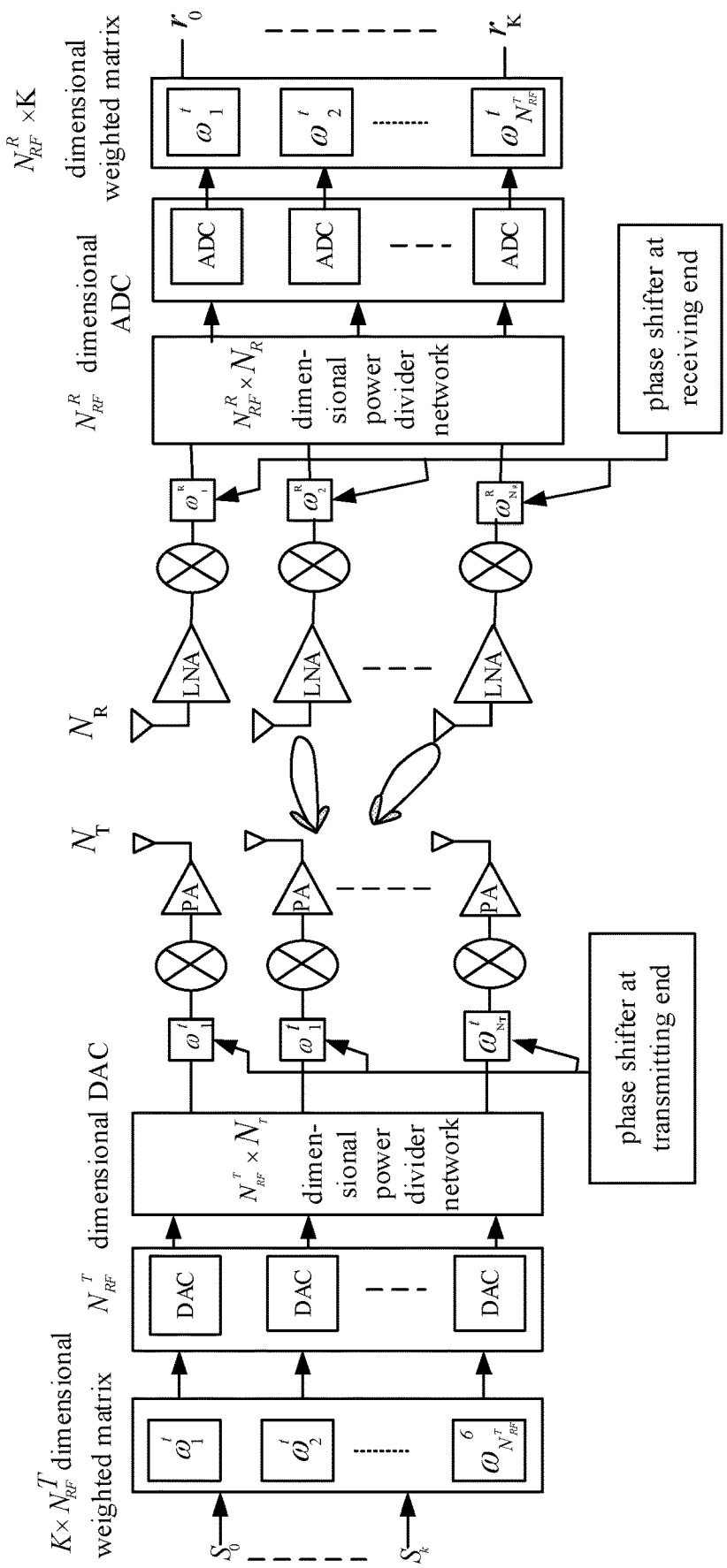
FIG. 3 is a schematic diagram of a hybrid digital and analog beamforming.

In order to further improve the analog beamforming performance, a hybrid digital and analog beamforming transceiver architecture is proposed, as shown in FIG. 3. In FIG. 3, the transmitting end and the receiving end have $N_{RF}^T$ and $N_{RF}^R$ transceiver units respectively, the transmitting end has $N^T$ antenna units, the receiving end has $N^R$ antenna units, where $N^T > N_{RF}^T$ and $N^R > N_{RF}^R$; the maximum number of parallel transmission streams supported by the beamforming is $\min(N_{RF}^T, N_{RF}^R)$. The hybrid beamforming architecture as shown in FIG. 3 strikes a balance between the flexibility of digital beamforming and the low complexity of analog beamforming, supports concurrent beamforming for multiple data streams and multiple user equipment, and meanwhile the complexity thereof is controlled reasonably.

For both the analog beamforming and the hybrid digital and analog beamforming, the analog beamforming weight is required to be adjusted on transmitting and receiving ends, so that the formed beam is aligned with a correspondent node. As to downlink transmission, beamforming weight for the transmission at the base station side and beamforming weight for the reception at the terminal side need to be adjusted; while as to uplink transmission, beamforming weight for the transmission at the terminal side and beamforming weight for the reception at the base station side need to be adjusted. The beamforming weights are often obtained by transmitting training signals. In the downlink direction, the base station transmits downlink beam training signals; the terminal measures the downlink beam training signals, selects the optimal base station transmission beam and feeds beam related information back to the base station, meanwhile the terminal selects corresponding optimal reception beam and stores the optimal reception beam locally. In the uplink direction, the terminal transmits uplink beam training signals; the base station measures the uplink beam training signals, selects the optimal terminal transmission beam and feeds beam related information back to the terminal, meanwhile the base station selects corresponding optimal reception beam and stores the optimal reception beam locally. The data transmission may commence as soon as the uplink and downlink transmission and reception beam trainings are completed.

The uplink and downlink beam trainings incur an increasing system overhead; in particular, the uplink beam training requires that every terminal transmits uplink beam training signals. In the case that the beam reciprocity is valid, the terminal may determine the uplink transmission beam on the basis of the downlink reception beam derived from the downlink beam training process, thereby reducing the overhead of uplink beam trainings.

In reality, due to the non-ideal device characteristics, the non-reciprocity of uplink and downlink interferences, etc., the uplink transmission beam obtained based on the uplink-downlink channel reciprocity may not be always the optimal beam. In this connection, optimal system performance may not be attained if the selection of the uplink transmission beam for the terminal solely depends on the beam reciprocity.

In an embodiment, optionally, prior to determining, by the base station, the uplink transmission beam indication information to the terminal, the base station may determine the beam type indication information in one of the following two modes.

Mode 1 includes: the base station determining the beam type indication information based on a measurement result of the base station.

Specifically, the base station measures uplink reference signals transmitted by the terminal to obtain a reception quality of each of the uplink reference signals; the base station measures an uplink signal (e.g. reference signal, data channel signal, etc.) transmitted by the terminal to obtain a reception quality of the uplink signal, where the uplink signal is transmitted by the terminal using the uplink transmission beam obtained based on the downlink reference signals; and in the case that the reception quality of at least one of the uplink reference signals is superior to the reception quality of the uplink signal, the base station selects to instruct the terminal to obtain the uplink transmission beam based on the uplink reference signals; otherwise, the base station selects to instruct the terminal to obtain the uplink transmission beam based on the downlink reference signals.

The obtaining the uplink transmission beam based on the downlink reference signals refers to selecting an uplink transmission beam corresponding to the downlink reference signals based on the channel reciprocity.

Mode 2 includes: the base station determining the beam type indication information based on the measurement result of the base station and a measurement result reported by the terminal.

Specifically, the base station measures uplink reference signals transmitted by the terminal to obtain a reception quality of each of the uplink reference signals, where the uplink reference signals are transmitted by the terminal using the uplink transmission beam derived from the uplink beam training process; the base station receives reception qualities of the downlink reference signals reported by the terminal; in the case that the reception quality of at least one of the uplink reference signals is superior to all the reception qualities of the downlink reference signals reported by the terminal, the base station selects to instruct the terminal to obtain the uplink transmission beam based on the uplink reference signals; and in the case that the reception quality of at least one of the downlink reference signals reported by the terminal is superior to all the reception qualities of the uplink reference signals, the base station selects to instruct the terminal to obtain the uplink transmission beam based on the downlink reference signals.

By means of the two modes described above, the base station is capable of selecting an appropriate uplink transmission beam for the terminal, thus enhancing the system performance when the channel reciprocity is non-ideal.

In an embodiment, optionally, the method further includes the base station receiving an uplink signal which is transmitted by the terminal using a determined uplink transmission beam.

Specifically, in the case that the base station indicates that the terminal obtains the uplink transmission beam based on the uplink reference signals, the base station receives the uplink signal from the terminal using an uplink reception beam corresponding to the uplink transmission beam indicated by the base station, where a correspondence between the uplink transmission beam and the uplink reception beam may be determined in the process of the uplink beam training; or in the case that the base station indicates that the terminal obtains the uplink transmission beam based on the downlink reference signals, the base station receives the uplink signal from the terminal using an uplink reception beam corresponding to the downlink transmission beam indicated by the base station, where a correspondence between the downlink transmission beam and the uplink reception beam may be based on the channel reciprocity.

In the present embodiment, whether the uplink transmission beam for the terminal is obtained based on uplink reference signals or downlink reference signals is indicated by beam type indication information, where the beam type indication information may be determined based on a measurement result of the base station, or based on the measurement result of the base station and a measurement result reported by the terminal. Therefore, it is ensured that the base station is capable of selecting an appropriate uplink transmission beam for the terminal, thus enhancing the system performance when the channel reciprocity is non-ideal.

Referring to FIG. 5, a flow of a method for determining an uplink transmission beam is illustrated. The method is applicable to a terminal and includes the following steps: step 501, a terminal receiving uplink transmission beam indication information transmitted by a base station; and step 502, the terminal determining the uplink transmission beam based on the uplink transmission beam indication information; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

In an embodiment, optionally, in the case that the base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes one of: an index of a downlink transmission beam, indication information of the downlink reference signals, or indication information of a downlink reception beam.

In an embodiment, optionally, in the case that the uplink transmission beam indication information indicates that the terminal obtains the uplink transmission beam based on the uplink reference signals, the terminal determines a weight of the uplink transmission beam on the basis of the index of the uplink transmission beam or the indication information of the uplink reference signals.

In an embodiment, optionally, the terminal determines the weight of the uplink transmission beam on the basis of a mapping relation between the index of the uplink transmission beam and a beamforming weight; or the terminal determines the weight of the uplink transmission beam on the basis of a mapping relation between the uplink transmission beam and a beamforming weight.

In an embodiment, optionally, in the case that the uplink transmission beam indication information indicates that the terminal obtains the uplink transmission beam based on the downlink reference signals, the terminal determines a weight of the uplink transmission beam on the basis of an index of a downlink transmission beam or indication information of the downlink reference signals. For example, the terminal determines a corresponding downlink reception beam on the basis of the index of the downlink transmission beam or indication information of the downlink reference signals, and determines the weight of the uplink transmission beam from the downlink reception beam based on the channel reciprocity.

In the present embodiment, whether the uplink transmission beam for the terminal is obtained based on uplink reference signals or downlink reference signals is indicated by beam type indication information, where the beam type indication information may be determined based on a measurement result of the base station, or based on the measurement result of the base station and a measurement result reported by the terminal. Therefore, it is ensured that the base station is capable of selecting appropriate uplink transmission beam for the terminal, thus enhancing the system performance when the channel reciprocity is non-ideal.

Figure 6:
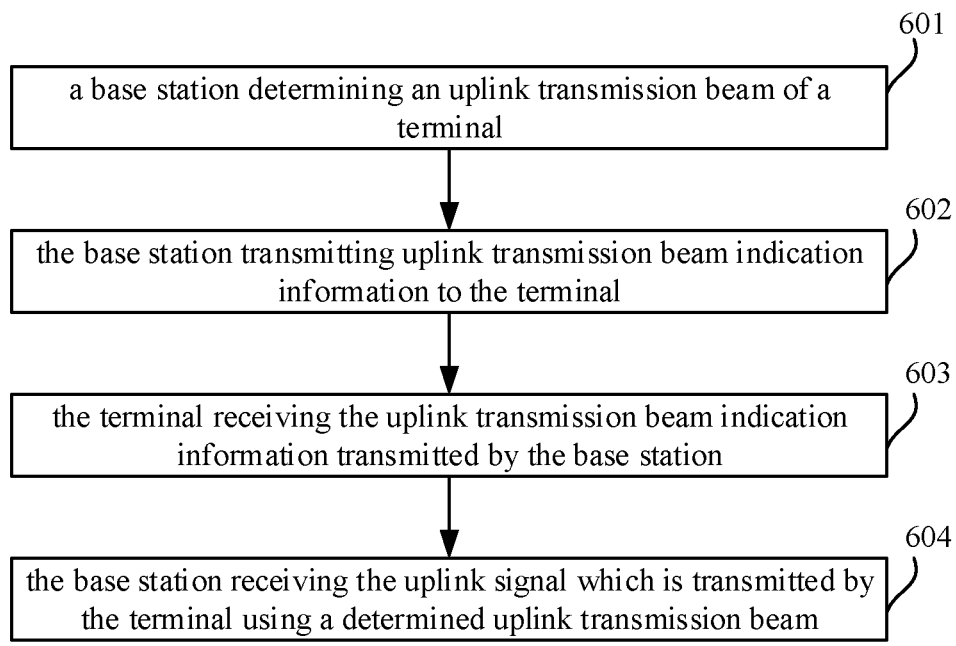
FIG. 6 is a flow chart of a method for determining an uplink transmission beam according to still other embodiments of the present disclosure.

Referring to FIG. 6, a flow of a method for determining an uplink transmission beam is illustrated. The method includes step 601 to step 604.

Step 601 includes: a base station determining an uplink transmission beam of a terminal.

In this step, the base station may determine the uplink transmission beam for the terminal in two modes as follows: mode 1, obtaining the uplink transmission beam based on the uplink-downlink channel reciprocity; and mode 2, determining the uplink transmission beam based on uplink reference signals.

The determining the uplink transmission beam based on uplink reference signals includes the following steps.

First, the terminal transmits uplink reference signals through a plurality of candidate uplink transmission beams.

The number of candidate uplink transmission beams of the terminal depends on the hardware capability of the terminal. Assume the terminal has $N_T^{UE}$ candidate uplink transmission beams, each uplink transmission beam corresponds to a set of beamforming weights, the transmission beamforming weights of the $n^{th}$ beam are $Z_n=[Z_1{}^n Z_2{}^n \ldots Z_L{}^n]^T$, where L is a number of antenna units used in the beamforming and may be less than a number of antenna units of the terminal. The terminal may transmit one uplink reference signal for each candidate uplink transmission beam. For example, in the case of $N_T^{UE}$ uplink transmission beams, the terminal may transmit $N_T^{UE}$ uplink reference signals. The $N_T^{UE}$ uplink reference signals may be Time Division Multiplexed (TDM), Frequency Division Multiplexed (FDM), Code Division Multiplexed (CDM), or multiplexed using a combination of various multiplexing modes. For example, in an Orthogonal Frequency Division Multiplexing (OFDM) based system, $N_T^{UE}$ uplink reference signals may occupy $N_T^{UE}$ OFDM symbols, i.e., each uplink reference signal occupies one OFDM symbol, and the uplink reference signals are Time Division Multiplexed. Alternatively, the uplink reference signals on multiple beams may be transmitted in one OFDM symbol, and the uplink reference signals are Frequency Division Multiplexed or Code Division Multiplexed.

The beam training signal for each beam is transmitted after a beamforming using a beamforming weight corresponding to the beam is performed on the beam training signal.

The uplink transmission beam training signals of the terminal are transmitted on resources configured by the base station. The resources configured may be periodic resources, non-periodic resources or semi-persistent resources.

Second, the base station determines an optimal uplink transmission beam by receiving the uplink reference signals transmitted by the terminal.

Specifically, the base station may determine the optimal uplink transmission beam by measuring the uplink reference signals.

For example, the terminal may select the beam corresponding to the strongest uplink reference signal reception power as the optimal uplink transmission beam. The optimal uplink transmission beam may include one beam (i.e., one beam is recommended per training process and plural different beams may be recommended in plural beam training processes), or the optimal uplink transmission beam may include multiple beams.

The base station determines an index of the optimal uplink transmission beam. The index may be designated in the range of all candidate uplink transmission beams of the terminal, e.g., the indexes of $N_T^{UE}$ candidate uplink transmission beams are respectively $0, 1, \ldots, N_T^{UE}-1$. The index may also be designated in the range of uplink reference signals transmitted by the terminal, e.g., if the terminal transmits $N_T^{RS}$ uplink reference signals and each beam training signal corresponds to one uplink transmission beam, the indexes of the uplink transmission beams fall in the range of $0, 1, \ldots, N_T^{RS}-1$.

In a possible implementation, the uplink beam training processes are performed at large interval, and the uplink transmission beam is determined based on the channel reciprocity between two consecutive beam training processes.

Step 602 includes: the base station transmitting uplink transmission beam indication information to the terminal, where the uplink transmission beam indication information includes beam type indication information, the beam type indication information is used to indicate whether the uplink transmission beam for the terminal is determined based on uplink reference signals or downlink reference signals.

In the case that the uplink transmission beam for the terminal is determined based on the uplink reference signals, the uplink transmission beam indication information includes an index of the uplink transmission beam or indication information of the uplink reference signals.

In the case that the uplink transmission beam for the terminal is obtained based on the uplink-downlink channel reciprocity, the uplink transmission beam indication information includes an index of a downlink transmission beam, indication information of the downlink reference signals or indication information of a downlink reception beam.

In an embodiment, the base station may determine a type of the uplink transmission beam for the terminal based on a measurement result of the base station.

For example, the base station measures the uplink reference signals (aka uplink beam training signals) transmitted by the terminal to obtain the reception quality of each uplink reference signal, such as Reference Signal Receiving Power (RSRP). Meanwhile, the base station may measure the uplink signal, such as reference signal and data channel signal, transmitted by the terminal using a beam obtained based on channel reciprocity, to obtain the RSRP value. The base station compares the resultant values of the measurements. If the reception quality of at least one uplink reference signal is superior to the reception quality of the uplink signal transmitted based on channel reciprocity, the base station may select to instruct the terminal to determine the uplink transmission beam based on uplink reference signals; otherwise, the base station may select to instruct the terminal to determine the uplink transmission beam based on downlink reference signals.

In an embodiment, the base station may determine a type of the uplink transmission beam for the terminal based on a measurement result of the base station and a measurement result reported by the terminal.

For example, the base station measures the uplink reference signals transmitted by the terminal to obtain the reception quality of each uplink reference signal, such as RSRP. Meanwhile, the base station receives the reception qualities, such as RSRP values, of the downlink reference signals reported by the terminal. The base station compares the two types of reception qualities. If the reception quality of at least one uplink reference signal is superior to all the reception qualities of the downlink reference signals reported by the terminal, the base station may select to instruct the terminal to determine the uplink transmission beam based on uplink reference signals; if the reception quality of at least one of the downlink reference signals reported by the terminal is superior to all the reception qualities of the uplink reference signals, the base station may select to instruct the terminal to determine the uplink transmission beam based on downlink reference signals.

Since the reception quality is influenced by transmission power, the base station needs to eliminate the influence of the transmission power when making the comparison, that is, the transmission power of the terminal should be deducted from the measurement result of the base station, and the transmission power of the base station should be deducted from the measurement result reported by the terminal.

Step 603 includes: the terminal receiving the uplink transmission beam indication information transmitted by the base station.

First, in the case that the uplink transmission beam indication information indicates that the terminal determines the uplink transmission beam based on the uplink reference signals, the terminal determines a weight of the uplink transmission beam on the basis of the index of the uplink transmission beam (or the indication information of the uplink reference signals).

For example, if the index of the uplink transmission beam is designated in the range of all candidate uplink transmission beams, the terminal may determine the weight of the uplink transmission beam in accordance with a mapping relation between the index and a beamforming weight, where the mapping relation is stored in the terminal. For another example, if the index of the uplink transmission beam is designated in the range of uplink reference signals, the terminal may determine the weight of the uplink transmission beam in accordance with a mapping relation among the index, an uplink reference signal and a beamforming weight, where the mapping relation is stored in the terminal.

Second, in the case that the uplink transmission beam indication information indicates that the terminal obtains the uplink transmission beam based on the uplink-downlink channel reciprocity, the terminal determines a weight of the uplink transmission beam on the basis of an index of a downlink transmission beam (or indication information of the downlink reference signals, etc.).

Specifically, the terminal determines a corresponding downlink reception beam on the basis of the index of the downlink transmission beam (or indication information of the downlink reference signals, etc.), and determines the weight of the uplink transmission beam from the downlink reception beam based on the channel reciprocity.

It is noted, a same set of beamforming weights may be used in both downlink reception and uplink transmission to create reception and transmission beams pointing to the same direction (or similar directions). Alternatively, there is a specific correspondence between the downlink reception beam and the uplink transmission beam for the terminal; as a result, having determined the downlink reception beam used to receive the signal from the base station, a uplink transmission beam may be determined based on the correspondence, whereby the uplink signal/channel/data of the terminal may be transmitted to the base station through the uplink transmission beam.

The downlink reception beam corresponding to the downlink transmission beam may be obtained in the following downlink beam training process (this process may be performed prior to the reception of the indication information instead of being performed subsequent to the reception of the indication information).

First, the base station transmits downlink beam training signals. The base station has $N_T^{BS}$ candidate downlink transmission beams in total, each downlink transmission beam corresponds to one set of beamforming weights, and the transmission beamforming weights of the $n^{th}$ beam are $W_n=[W_1^n W_2^n \ldots W_K^n]^T$, where K is a number of antenna units used in the beamforming and may be less than a number of antenna units of the base station. The base station may transmit one beam training signal for each candidate downlink transmission beam. For example, in the case of $N_T^{BS}$ downlink transmission beams, the base station may transmit $N_T^{BS}$ training signals. The $N_T^{BS}$ training signals may be Time Division Multiplexed (TDM), Frequency Division Multiplexed (FDM), Code Division Multiplexed (CDM), or multiplexed using a combination of various multiplexing modes. For example, in an OFDM based system, $N_T^{BS}$ training signals may occupy $N_T^{BS}$ OFDM symbols, i.e., each training signal occupies one OFDM symbol, and the training signals are Time Division Multiplexed. Alternatively, the training signals on multiple beams may be transmitted in one OFDM symbol, and the training signals are Frequency Division Multiplexed or Code Division Multiplexed.

The beam training signal for each beam is transmitted after a beamforming using a beamforming weight corresponding to the beam is performed on the beam training signal.

The beam training signals are transmitted periodically, non-periodically or semi-persistently.

Second, the terminal receives the downlink beam training signals transmitted by the base station, and selects a downlink reception beam corresponding to the downlink transmission beam by measuring the beam training signals.

The terminal determines a reception beam corresponding to one downlink transmission beam. The reception beam for the terminal may be selected from candidate reception beams. The terminal has $N_R^{UE}$ reception beams, each reception beam corresponds to a set of beamforming weights, the reception beamforming weights of the $n^{th}$ beam are $V_n=[V_1^n V_2^n \ldots V_L^n]^T$, where L is a number of antenna units used in the beamforming and may be less than a number of antenna units of the terminal. The terminal may attempt to receive a downlink beam training signal (or other signal) by using each reception beam, and select the reception beam with the strongest reception signal power as the reception beam corresponding to the downlink transmission beam.

Step 604 includes: the base station receiving the uplink signal which is transmitted by the terminal using a determined uplink transmission beam.

In the case that the base station indicates that the terminal determines the uplink transmission beam based on the uplink reference signals, the base station receives the uplink signal from the terminal using an uplink reception beam corresponding to the uplink transmission beam indicated by the base station. The correspondence may be determined in the uplink beam training process.

In the case that the base station indicates that the terminal obtains the uplink transmission beam based on the channel reciprocity, the base station receives the uplink signal from the terminal using an uplink reception beam corresponding to the downlink transmission beam indicated by the base station. The correspondence may be based on the channel reciprocity.

Based on the same inventive concept, an apparatus for determining an uplink transmission beam is also provided in embodiments of the present disclosure. Since the working principle of the apparatus is similar to the method for determining an uplink transmission beam as shown in FIG. 4 and FIG. 6 according to embodiments of the present disclosure, the implementation of the apparatus may be learned by referring to the implementation of the method, thus a repeated description is omitted.

Figure 7:
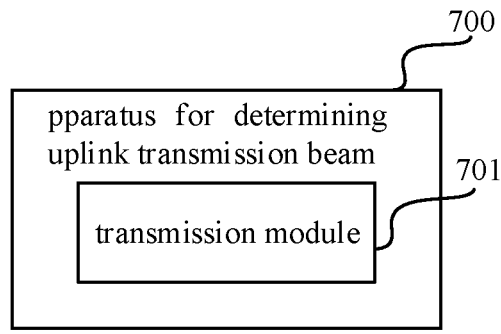
FIG. 7 is a block diagram of an apparatus for determining an uplink transmission beam according to some embodiments of the present disclosure.

Referring to FIG. 7, a structure of the apparatus for determining an uplink transmission beam is illustrated. The apparatus 700 includes: a transmission module 701, configured to transmit uplink transmission beam indication information to a terminal; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

In an embodiment, optionally, in the case that the base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes an index of a downlink transmission beam, indication information of the downlink reference signals or indication information of a downlink reception beam.

In the present embodiment, optionally, the apparatus further includes: a first determination module, configured to determine the uplink transmission beam for the terminal based on the uplink reference signals, or determine the uplink transmission beam for the terminal based on an uplink-downlink beam reciprocity.

In an embodiment, optionally, the first determination module includes: a receiver unit, configured to receive the uplink reference signals transmitted by the terminal through a plurality of candidate uplink transmission beams; and a first determination unit, configured to determine an optimal uplink transmission beam on the basis of the uplink reference signals.

In an embodiment, optionally, the uplink reference signal of each of the plurality of candidate uplink transmission beams is transmitted after a beamforming using a beamforming weight corresponding to the candidate uplink transmission beam is performed on the uplink reference signal.

In an embodiment, optionally, the apparatus further includes: a second determination module, configured to determine the beam type indication information based on a measurement result of the base station, or determine the beam type indication information based on the measurement result of the base station and a measurement result reported by the terminal.

In the present embodiment, optionally, the second determination module includes: a first measurement unit, configured to measure uplink reference signals transmitted by the terminal to obtain a reception quality of each of the uplink reference signals; a second measurement unit, configured to measure an uplink signal transmitted by the terminal to obtain a reception quality of the uplink signal, where the uplink signal is transmitted by the terminal using the uplink transmission beam obtained based on the downlink reference signals; and a first selection unit, configured to, in the case that the reception quality of at least one of the uplink reference signals is superior to the reception quality of the uplink signal, select to instruct the terminal to obtain the uplink transmission beam based on the uplink reference signals; otherwise, select to instruct the terminal to obtain the uplink transmission beam based on the downlink reference signals.

In an embodiment, optionally, the second determination module includes: a third measurement unit, configured to measure uplink reference signals transmitted by the terminal to obtain a reception quality of each of the uplink reference signals; a first receiver unit, configured to receive reception qualities of the downlink reference signals reported by the terminal; and a second selection unit, configured to, in the case that the reception quality of at least one of the uplink reference signals is superior to all the reception qualities of the downlink reference signals reported by the terminal, select to instruct the terminal to obtain the uplink transmission beam based on the uplink reference signals; and in the case that the reception quality of at least one of the downlink reference signals reported by the terminal is superior to all the reception qualities of the uplink reference signals, select to instruct the terminal to obtain the uplink transmission beam based on the downlink reference signals.

In an embodiment, optionally, the apparatus further includes: a first receiver module, configured to receive an uplink signal which is transmitted by the terminal using a determined uplink transmission beam.

In an embodiment, optionally, the first receiver module includes: a second receiver unit, configured to, in the case that it is indicated that the terminal obtains the uplink transmission beam based on the uplink reference signals, receive the uplink signal from the terminal using an uplink reception beam corresponding to the uplink transmission beam indicated; or in the case that it is indicated that the terminal obtains the uplink transmission beam based on the downlink reference signals, receive the uplink signal from the terminal using an uplink reception beam corresponding to the downlink transmission beam indicated.

Based on the same inventive concept, an apparatus for determining an uplink transmission beam is also provided in embodiments of the present disclosure. Since the operating principle of the apparatus is similar to the method for determining an uplink transmission beam as shown in FIG. 5 and FIG. 6 according to embodiments of the present disclosure, the implementation of the apparatus may be learned by referring to the implementation of the method, thus a repeated description is omitted.

Figure 8:
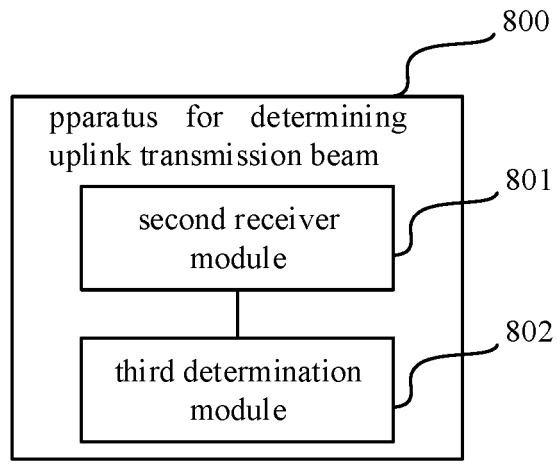
FIG. 8 is a block diagram of an apparatus for determining an uplink transmission beam according to other embodiments of the present disclosure.

Referring to FIG. 8, a structure of the apparatus for determining an uplink transmission beam is illustrated. The apparatus 800 includes: a second receiver module 801, configured to receive uplink transmission beam indication information transmitted by a base station; and a third determination module 802, configured to determine the uplink transmission beam based on the uplink transmission beam indication information; where the uplink transmission beam indication information includes beam type indication information, the beam type indication information is used to indicate that the uplink transmission beam of a terminal is obtained based on uplink reference signals, or the beam type indication information is used to indicate that the uplink transmission beam for the terminal is obtained based on downlink reference signals.

In an embodiment, optionally, in the case that the base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes an index of a downlink transmission beam, indication information of the downlink reference signals or indication information of a downlink reception beam.

In an embodiment, optionally, the apparatus further includes: a fourth determination module, configured to, in the case that the uplink transmission beam indication information indicates that the terminal obtains the uplink transmission beam based on the uplink reference signals, determine a weight of the uplink transmission beam on the basis of the index of the uplink transmission beam or the indication information of the uplink reference signals.

In an embodiment, optionally, the fourth determination module is further configured to determine the weight of the uplink transmission beam on the basis of a mapping relation between the index of the uplink transmission beam and a beamforming weight; or determine the weight of the uplink transmission beam on the basis of a mapping relation between the uplink transmission beam and a beamforming weight.

In an embodiment, optionally, the apparatus further includes: a fifth determination module, configured to determine a weight of the uplink transmission beam on the basis of an index of a downlink transmission beam or indication information of the downlink reference signals, in the case that the uplink transmission beam indication information indicates that the terminal obtains the uplink transmission beam based on the downlink reference signals.

In an embodiment, optionally, the fifth determination module includes: a second determination unit, configured to determine a corresponding downlink reception beam on the basis of the index of the downlink transmission beam or the indication information of the downlink reference signals; and a third determination unit, configured to determine, based on a channel reciprocity, the weight of the uplink transmission beam from the downlink reception beam.

A base station is further provided according to embodiments of the present disclosure. The base station includes a first memory, a first processor and a computer program that is stored on the first memory and executable by the first processor, where the first processor is configured to execute the computer program to implement steps of the method for determining an uplink transmission beam as described above.

Figure 9:
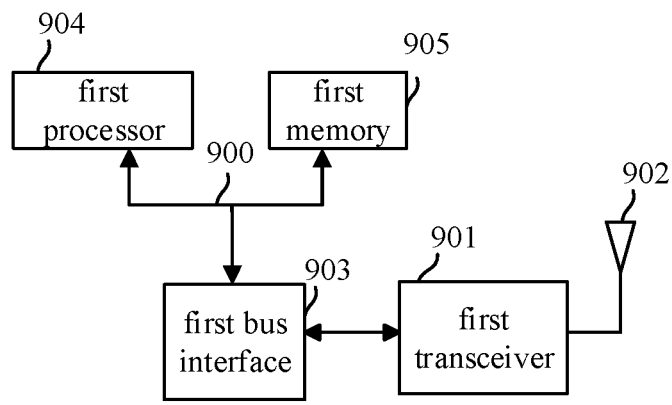
FIG. 9 is a schematic structural diagram of a base station according to some embodiments of the present disclosure.

Referring to FIG. 9, a structure of the base station is illustrated. The base station includes a first memory, a first processor and a computer program that is stored on the first memory and executable by the first processor, where the first processor is configured to execute the computer program to implement the following steps: transmitting uplink transmission beam indication information to a terminal; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

In FIG. 9, a bus architecture is represented by a first bus 900. The first bus 900 may include any number of interconnected buses and bridges, and the first bus 900 connects various circuits including one or more processors represented by a first processor 904 and memories represented by a first memory 905. The first bus 900 may also connect various other circuits such as peripherals, voltage regulators and power management circuits, which is well known in the art. Therefore, a detailed description thereof is omitted herein. A first bus interface 903 acts as an interface between the first bus 900 and a first transceiver 901. The first transceiver 901 may be one or more elements, such as multiple receivers and transmitters, to allow for communication with various other apparatuses on the transmission medium. Data processed by the first processor 904 is transmitted by the first antenna 902 on a wireless medium; further, the first antenna 902 also receives data and transfers the data to the first processor 904.

The first processor 904 is responsible for the management of the first bus 900 and regular operations, and also capable of providing a variety of functions, including clocking, peripheral interface, voltage regulation, power management and other control functions. The first memory 905 may be used to store data being used by the first processor 904 while in operation.

Optionally, the first processor 904 may include Central Processing Unit (CPU), Application Specific Integrated Circuit (ASIC), Field-Programmable Gate Array (FPGA) or Complex Programmable Logic Device (CPLD).

Optionally, in the case that the base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes an index of a downlink transmission beam, indication information of the downlink reference signals or indication information of a downlink reception beam.

Optionally, the first processor is further configured to determine the uplink transmission beam for the terminal based on the uplink reference signals, or determine the uplink transmission beam for the terminal based on an uplink-downlink beam reciprocity.

Optionally, the first processor is further configured to receive the uplink reference signals transmitted by the terminal through a plurality of candidate uplink transmission beams, and determine an optimal uplink transmission beam on the basis of the uplink reference signals.

Optionally, the uplink reference signal of each of the plurality of candidate uplink transmission beams is transmitted after a beamforming using a beamforming weight corresponding to the candidate uplink transmission beam is performed on the uplink reference signal.

Optionally, the uplink reference signals of the terminal are transmitted on resources configured by the base station.

Optionally, the first processor is further configured to determine the beam type indication information based on a measurement result of the base station, or determine the beam type indication information based on the measurement result of the base station and a measurement result reported by the terminal.

Optionally, the first processor is further configured to measure uplink reference signals transmitted by the terminal to obtain a reception quality of each of the uplink reference signals; measure an uplink signal transmitted by the terminal utilizing channel reciprocity to obtain a reception quality of the uplink reference signal transmitted utilizing channel reciprocity; and in the case that the reception quality of at least one of the uplink reference signals is superior to the reception quality of the uplink signal transmitted utilizing channel reciprocity, select to instruct the terminal to obtain the uplink transmission beam based on the uplink reference signals; otherwise, select to instruct the terminal to obtain the uplink transmission beam based on the downlink reference signals.

Optionally, the first processor is further configured to measure uplink reference signals transmitted by the terminal to obtain a reception quality of each of the uplink reference signals; receive reception qualities of the downlink reference signals reported by the terminal; in the case that the reception quality of at least one of the uplink reference signals is superior to all the reception qualities of the downlink reference signals reported by the terminal, select to instruct the terminal to obtain the uplink transmission beam based on the uplink reference signals; and in the case that the reception quality of at least one of the downlink reference signals reported by the terminal is superior to all the reception qualities of the uplink reference signals, select to instruct the terminal to obtain the uplink transmission beam based on the downlink reference signals.

Optionally, the first processor is further configured to receive an uplink signal which is transmitted by the terminal using a determined uplink transmission beam.

Optionally, the first processor is further configured to, in the case that it is indicated that the terminal obtains the uplink transmission beam based on the uplink reference signals, receive the uplink signal from the terminal using an uplink reception beam corresponding to the uplink transmission beam indicated by the base station; or in the case that it is indicated that the terminal obtains the uplink transmission beam based on the downlink reference signals, receive the uplink signal from the terminal using an uplink reception beam corresponding to the downlink transmission beam indicated.

A terminal is also provided in embodiments of the present disclosure. The terminal includes a second memory, a second processor and a computer program stored on the second memory and configured to be executed by the second processor, where the second processor is configured to execute the computer program to implement steps of the method for determining an uplink transmission beam as described above.

Figure 10:
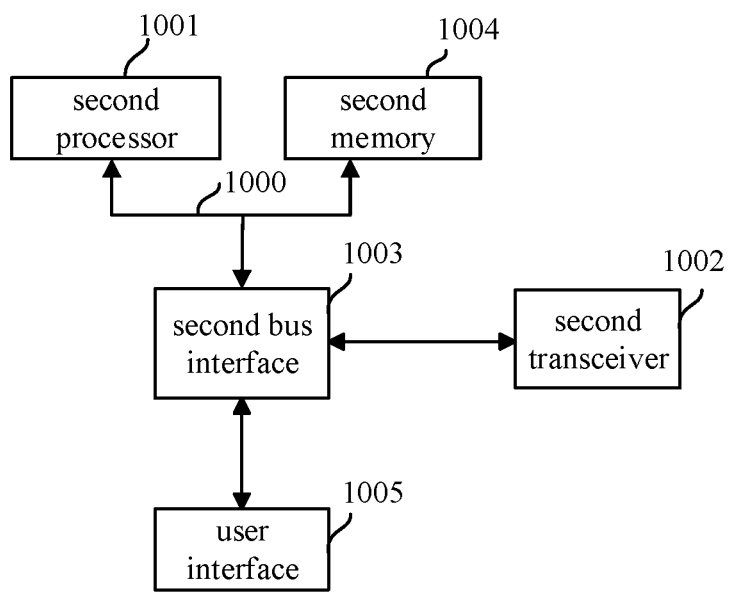
FIG. 10 is a schematic structural diagram of a terminal according to some embodiments of the present disclosure.

Referring to FIG. 10, a structure of the terminal is illustrated. The terminal includes a second memory, a second processor and a computer program stored on the second memory and configured to be executed by the second processor, where the second processor is configured to execute the computer program to implement the following steps: receiving uplink transmission beam indication information transmitted by a base station; determining the uplink transmission beam based on the uplink transmission beam indication information; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

In FIG. 10, a bus architecture is represented by a second bus 1000. The second bus 1000 may include any number of interconnected buses and bridges, and the second bus 1000 connects various circuits including one or more processors represented by a second general purpose processor 1001 and memories represented by a second memory 1004. The second bus 1000 may also connect various other circuits such as peripherals, voltage regulators and power management circuits, which is well known in the art. Therefore, a detailed description thereof is omitted herein. A second bus interface 1003 acts as an interface between the second bus 1000 and a second transceiver 1002. The second transceiver 1002 may be one or more elements, such as multiple receivers and transmitters, to allow for communication with various other apparatuses on the transmission medium. For example, the second transceiver 1002 receives external data from other devices. The second transceiver 1002 is configured to transmit data processed by the second processor 1001 to other devices. Depending on the properties of the computing system, user interface 1005 may also be provided, e.g., keypad, display, speaker, microphone and joystick.

The second processor 1001 is responsible for the management of the second bus 1000 and regular operations, such as running a generic operating system. The second memory 1004 may be used to store data used by the second processor 1001 while in operation.

Optionally, the second processor 1001 may include CPU, ASIC, FPGA or CPLD.

Optionally, in the case that the base station indicates that the uplink transmission beam for the terminal is obtained based on the uplink reference signals, the uplink transmission beam indication information includes an index of the uplink transmission beam or indication information of the uplink reference signals; or in the case that the base station indicates that the uplink transmission beam for the terminal is obtained based on the downlink reference signals, the uplink transmission beam indication information includes an index of a downlink transmission beam, indication information of the downlink reference signals or indication information of a downlink reception beam.

Optionally, the second processor 1001 is further configured to, in the case that the uplink transmission beam indication information indicates that the terminal obtains the uplink transmission beam based on the uplink reference signals, determine a weight of the uplink transmission beam on the basis of an index of the uplink transmission beam or indication information of the uplink reference signals.

Optionally, the second processor 1001 is further configured to, in the case that the index of the uplink reference signal is designated in the range of all candidate beams, determine the weight of the uplink transmission beam in accordance with a mapping relation between the index of the uplink transmission beam and a beamforming weight; or in the case that the index of the uplink reference signal is designated in the range of uplink reference signals, determine the weight of the uplink transmission beam in accordance with a mapping relation between the uplink transmission beam and a beamforming weight.

Optionally, the second processor 1001 is further configured to, in the case that the uplink transmission beam indication information indicates that the terminal obtains the uplink transmission beam based on the downlink reference signals, determine a weight of the uplink transmission beam on the basis of an index of a downlink transmission beam or indication information of the downlink reference signals.

Optionally, the second processor 1001 is further configured to determine a corresponding downlink reception beam on the basis of the index of the downlink transmission beam or the indication information of the downlink reference signals; and determine, based on the channel reciprocity, the weight of the uplink transmission beam from the downlink reception beam.

A computer readable storage medium storing therein a computer program (instructions) is also provided in embodiments of the present disclosure, the computer program (instructions) is configured to be executed by a processor to implement the following steps: transmitting uplink transmission beam indication information to a terminal; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

In an embodiment, optionally, the computer program (instructions) is configured to be executed by a processor to implement the following step: determining the uplink transmission beam for the terminal based on the uplink reference signals, or determining the uplink transmission beam for the terminal based on an uplink-downlink beam reciprocity.

In an embodiment, optionally, the computer program (instructions) is configured to be executed by a processor to implement the following steps: receiving the uplink reference signals transmitted by the terminal through a plurality of candidate uplink transmission beams, and determining an optimal uplink transmission beam on the basis of the uplink reference signals.

In an embodiment, optionally, the computer program (instructions) is configured to be executed by a processor to implement the following step: determining the beam type indication information based on a measurement result of the base station, or determining the beam type indication information based on the measurement result of the base station and a measurement result reported by the terminal.

In an embodiment, optionally, the computer program (instructions) is configured to be executed by a processor to implement the following steps: measuring uplink reference signals transmitted by the terminal to obtain a reception quality of each of the uplink reference signals; measuring an uplink signal transmitted by the terminal utilizing channel reciprocity to obtain a reception quality of the uplink reference signal transmitted utilizing channel reciprocity; and in the case that the reception quality of at least one of the uplink reference signals is superior to the reception quality of the uplink signal transmitted utilizing channel reciprocity, selecting to instruct the terminal to obtain the uplink transmission beam based on the uplink reference signals; otherwise, selecting to instruct the terminal to obtain the uplink transmission beam based on the downlink reference signals.

In an embodiment, optionally, the computer program (instructions) is configured to be executed by a processor to implement the following steps: measuring uplink reference signals transmitted by the terminal to obtain a reception quality of each of the uplink reference signals; receiving reception qualities of the downlink reference signals reported by the terminal; in the case that the reception quality of at least one of the uplink reference signals is superior to all the reception qualities of the downlink reference signals reported by the terminal, selecting to instruct the terminal to obtain the uplink transmission beam based on the uplink reference signals; and in the case that the reception quality of at least one of the downlink reference signals reported by the terminal is superior to all the reception qualities of the uplink reference signals, selecting to instruct the terminal to obtain the uplink transmission beam based on the downlink reference signals.

In an embodiment, optionally, the computer program (instructions) is configured to be executed by a processor to implement the following steps: in the case that the base station indicates that the terminal obtains the uplink transmission beam based on the uplink reference signals, receiving the uplink signal from the terminal using an uplink reception beam corresponding to the uplink transmission beam indicated by the base station; or in the case that the base station indicates that the terminal obtains the uplink transmission beam based on the downlink reference signals, receiving the uplink signal from the terminal using an uplink reception beam corresponding to the downlink transmission beam indicated by the base station.

A computer readable storage medium storing therein a computer program (instructions) is also provided according to embodiments of the present disclosure, the computer program (instructions) is configured to be executed by a processor to implement the following steps: receiving uplink transmission beam indication information transmitted by a base station; and determining the uplink transmission beam based on the uplink transmission beam indication information; where the uplink transmission beam indication information includes beam type indication information, the beam type indication information is used to indicate that the uplink transmission beam for the terminal is obtained based on uplink reference signals, or the beam type indication information is used to indicate that the uplink transmission beam for the terminal is obtained based on downlink reference signals.

In an embodiment, optionally, the computer program (instructions) is configured to be executed by a processor to implement the following step: in the case that the uplink transmission beam indication information indicates that the terminal obtains the uplink transmission beam based on the uplink reference signals, determining a weight of the uplink transmission beam on the basis of the index of the uplink transmission beam or the indication information of the uplink reference signals.

In an embodiment, optionally, the computer program (instructions) is configured to be executed by a processor to implement the following step: in the case that the index of the uplink reference signal is designated in the range of all candidate beams, determining the weight of the uplink transmission beam in accordance with a mapping relation between the index of the uplink transmission beam and a beamforming weight; or in the case that the index of the uplink reference signal is designated in the range of uplink reference signals, determining the weight of the uplink transmission beam in accordance with a mapping relation between the uplink transmission beam and a beamforming weight.

In an embodiment, optionally, the computer program (instructions) is configured to be executed by a processor to implement the following step: in the case that the uplink transmission beam indication information indicates that the terminal determines the uplink transmission beam based on the downlink reference signals, determining a weight of the uplink transmission beam on the basis of an index of a downlink transmission beam or indication information of the downlink reference signals.

In an embodiment, optionally, the computer program (instructions) is configured to be executed by a processor to implement the following steps: determining a corresponding downlink reception beam on the basis of the index of the downlink transmission beam or the indication information of the downlink reference signals; and determining, based on the channel reciprocity, the weight of the uplink transmission beam from the downlink reception beam.

It should be appreciated that, "one embodiment" or "an embodiment" mentioned throughout the specification mean specific features, structures or characteristics related to the embodiment are included in at least one embodiment of the present disclosure. Therefore, "in one embodiment" or "in an embodiment" mentioned throughout the specification does not necessarily refer to the same embodiment. Additionally, these specific features, structures or characteristics may be combined in any suitable manner in one or more embodiments.

In various embodiments of the present disclosure, it should be appreciated that, the numbering of various processes is not intended to imply an execution sequence. The execution sequence of the processes should be determined in accordance with the functions and inherent logic thereof, and by no means constitutes any limitation as to the implementation of the embodiments of the present disclosure.

Additionally, the terms "system" and "network" are often interchangeable herein.

It is understandable that, the term "and/or" as used herein merely refers to an association relationship between objects to be associated and means there is three possibilities. For example, A and/or B may represent: only A exists, both A and B exist, and only B exists. Additionally, the symbol "/" as used herein generally represents that there is a "or" relationship between the objects to be associated.

In the embodiments provided in the present disclosure, it should be understood that, expression "B corresponding to A" represents that B is associated with A, and B may be determined according to A. Moreover, it should be further understood that, B being determined according to A does not mean B is determined exclusively according to A, rather, B may be determined according A and/or other information.

In the several embodiments provided in the present disclosure, it should be understood that the disclosed methods and devices may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electrical, mechanical, or other forms.

In addition, various functional units in the embodiments of the present disclosure may be integrated into one processing unit, or each of the units may exist alone physically. Alternatively, two or more these functional units may be integrated into one unit. The above integrated unit may be implemented in form of hardware, or may be implemented in form of a combination of hardware and software functional units.

The integrated units implemented in form of software functional unit may be stored in a computer-readable storage medium. The software functional unit is stored in a storage medium, and includes several instructions for instructing a computer device (which may be a personal computer, a server, or a network device) to perform a part of the steps of the transmitting and receiving methods described in the embodiments of the present disclosure. The foregoing storage medium includes any medium that can store program codes, such as a Universal Serial Bus (USB) flash drive, a removable hard disk, a Read-Only Memory (ROM), a Random Access Memory (RAM), a magnetic disk, or an optical disc.

The above descriptions are merely optional implementations of the present disclosure. It should be noted that, modifications and improvements may be made by a person of ordinary skill in the art without departing from the principle of the present disclosure, and these modifications and improvements shall fall within the scope of the present disclosure.

What is claimed is:

1. A method for determining an uplink transmission beam, comprising:
   transmitting, by a base station, uplink transmission beam indication information to a terminal;
   wherein the uplink transmission beam indication information comprises beam type indication information, the beam type indication information is used to indicate whether the uplink transmission beam for the terminal is obtained based on uplink reference signals or obtained based on downlink reference signals.

2. The method according to claim 1, wherein
   in the case that the base station indicates that the uplink transmission beam for the terminal is obtained based on the uplink reference signals, the uplink transmission beam indication information comprises an index of the uplink transmission beam or indication information of the uplink reference signals; or
   in the case that the base station indicates that the uplink transmission beam for the terminal is obtained based on the downlink reference signals, the uplink transmission beam indication information comprises an index of a downlink transmission beam, indication information of the downlink reference signals, or indication information of a downlink reception beam.

3. The method according to claim 2, further comprising:
   receiving, by the base station, an uplink signal that is transmitted by the terminal using a determined uplink transmission beam, wherein the receiving, by the base station, the uplink signal that is transmitted by the terminal using the determined uplink transmission beam comprises:
   receiving, by the base station, the uplink signal from the terminal using an uplink reception beam corresponding to the uplink transmission beam indicated by the base station, in the case that the base station indicates that the terminal obtains the uplink transmission beam based on the uplink reference signals; or
   receiving, by the base station, the uplink signal from the terminal using an uplink reception beam corresponding to the downlink transmission beam indicated by the base station, in the case that the base station indicates that the terminal obtains the uplink transmission beam based on the downlink reference signals.

4. The method according to claim 1, wherein before transmitting, by the base station, the uplink transmission beam indication information to the terminal, the method further comprises:
   determining, by the base station, the uplink transmission beam for the terminal based on the uplink reference signals; or
   determining, by the base station, the uplink transmission beam for the terminal based on an uplink-downlink beam reciprocity.

5. The method according to claim 4, wherein the determining, by the base station, the uplink transmission beam for the terminal based on the uplink reference signals comprises:
   receiving, by the base station, the uplink reference signals transmitted by the terminal through a plurality of candidate uplink transmission beams; and determining, by the base station, an optimal uplink transmission beam on the basis of the uplink reference signals; and the uplink reference signal corresponding to each of the plurality of candidate uplink transmission beams is beamformed by using a beamforming weight corresponding to the candidate uplink transmission beam, and the beamformed uplink reference signal is transmitted.

6. The method according to claim 1, wherein before transmitting, by the base station, the uplink transmission beam indication information to the terminal, the method further comprises:

determining, by the base station, the beam type indication information based on a measurement result of the base station; or determining, by the base station, the beam type indication information based on the measurement result of the base station and a beam report reported by the terminal.

7. The method according to claim 6, wherein the determining, by the base station, the beam type indication information based on the measurement result of the base station comprises:

measuring, by the base station, uplink reference signals transmitted by the terminal to obtain a reception quality of each of the uplink reference signals;

measuring, by the base station, an uplink signal transmitted by the terminal to obtain a reception quality of the uplink signal, wherein the uplink signal is transmitted by the terminal using the uplink transmission beam that is obtained based on the downlink reference signals; and selecting, by the base station, to instruct the terminal to obtain the uplink transmission beam based on the uplink reference signals, in the case that the reception quality of at least one of the uplink reference signals is superior to the reception quality of the uplink signal; otherwise, selecting, by the base station, to instruct the terminal to obtain the uplink transmission beam based on the downlink reference signals.

8. The method according to claim 6, wherein the determining, by the base station, the beam type indication information based on the measurement result of the base station and the beam report reported by the terminal comprises:

measuring, by the base station, uplink reference signals transmitted by the terminal to obtain a reception quality of each of the uplink reference signals;

receiving, by the base station, reception qualities of the downlink reference signals reported by the terminal;

selecting, by the base station, to instruct the terminal to obtain the uplink transmission beam based on the uplink reference signals, in the case that the reception quality of at least one of the uplink reference signals is superior to all the reception qualities of the downlink reference signals reported by the terminal; and selecting, by the base station, to instruct the terminal to obtain the uplink transmission beam based on the downlink reference signals, in the case that the reception quality of at least one of the downlink reference signals reported by the terminal is superior to all the reception qualities of the uplink reference signals.

9. A method for determining an uplink transmission beam, comprising:

receiving, by a terminal, uplink transmission beam indication information transmitted by a base station; and determining, by the terminal, the uplink transmission beam based on the uplink transmission beam indication information, wherein the uplink transmission beam indication information comprises beam type indication information, the beam type indication information is used to indicate whether the uplink transmission beam for the terminal is obtained based on uplink reference signals or obtained based on downlink reference signals.

10. The method according to claim 9, wherein, in the case that the base station indicates that the uplink transmission beam for the terminal is obtained based on the uplink reference signals, the uplink transmission beam indication information comprises an index of the uplink transmission beam or indication information of the uplink reference signals; or in the case that the base station indicates that the uplink transmission beam for the terminal is obtained based on the downlink reference signals, the uplink transmission beam indication information comprises an index of a downlink transmission beam, indication information of the downlink reference signals, or indication information of a downlink reception beam.

11. The method according to claim 10, further comprising:

determining, by the terminal, a weight of the uplink transmission beam on the basis of the index of the uplink transmission beam or the indication information of the uplink reference signals, in the case that the uplink transmission beam indication information indicates that the terminal obtains the uplink transmission beam based on the uplink reference signals.

12. The method according to claim 10, further comprising:

determining, by the terminal, a weight of the uplink transmission beam on the basis of an index of a downlink transmission beam or indication information of the downlink reference signals, in the case that the uplink transmission beam indication information indicates that the terminal obtains the uplink transmission beam based on the downlink reference signals;

wherein the determining, by the terminal, the weight of the uplink transmission beam on the basis of the index of the downlink transmission beam or the indication information of the downlink reference signals comprises:

determining, by the terminal, a corresponding downlink reception beam on the basis of the index of the downlink transmission beam or the indication information of the downlink reference signals; and determining, based on a channel reciprocity, the weight of the uplink transmission beam from the downlink reception beam.

13. An apparatus for determining an uplink transmission beam, comprising:

a first memory, a first processor and a program that is stored on the first memory and executable by the first processor, wherein when executing the program, the first processor is configured to:

transmit uplink transmission beam indication information to a terminal;

wherein the uplink transmission beam indication information comprises beam type indication information, the beam type indication information is used to indicate whether the uplink transmission beam for the terminal is obtained based on uplink reference signals or obtained based on downlink reference signals.

14. The apparatus according to claim 13, wherein,
in the case that a base station indicates that the uplink transmission beam for the terminal is obtained based on the uplink reference signals, the uplink transmission beam indication information comprises an index of the uplink transmission beam or indication information of the uplink reference signals; or
in the case that the base station indicates that the uplink transmission beam for the terminal is obtained based on the downlink reference signals, the uplink transmission beam indication information comprises an index of a downlink transmission beam, indication information of the downlink reference signals, or indication information of a downlink reception beam; or
the first processor is further configured to: determine the uplink transmission beam for the terminal based on the uplink reference signals, or determine the uplink transmission beam for the terminal based on an uplink-downlink beam reciprocity.

15. The apparatus according to claim 14, wherein the first processor is further configured to:
receive the uplink reference signals transmitted by the terminal through a plurality of candidate uplink transmission beams; and
determine an optimal uplink transmission beam on the basis of the uplink reference signals; and
wherein the uplink reference signal corresponding to each of the plurality of candidate uplink transmission beams is beamformed by using a beamforming weight corresponding to the candidate uplink transmission beam, and the beamformed uplink reference signal is transmitted.

16. The apparatus according to claim 13, wherein the first processor is further configured to:
determine the beam type indication information based on a measurement result of a base station, or determine the beam type indication information based on the measurement result of the base station and a beam report reported by the terminal.

17. The apparatus according to claim 16, wherein the first processor is further configured to:
measure uplink reference signals transmitted by the terminal to obtain a reception quality of each of the uplink reference signals;
measure an uplink signal transmitted by the terminal to obtain a reception quality of the uplink signal, wherein the uplink signal is transmitted by the terminal using the uplink transmission beam that is obtained based on the downlink reference signals; and
in the case that the reception quality of at least one of the uplink reference signals is superior to the reception quality of the uplink signal, select to instruct the terminal to obtain the uplink transmission beam based on the uplink reference signals; otherwise, select to instruct the terminal to obtain the uplink transmission beam based on the downlink reference signals; or
wherein the first processor is further configured to:
measure uplink reference signals transmitted by the terminal to obtain a reception quality of each of the uplink reference signals;
receive reception qualities of the downlink reference signals reported by the terminal; and
in the case that the reception quality of at least one of the uplink reference signals is superior to all the reception qualities of the downlink reference signals reported by the terminal, select to instruct the terminal to obtain the uplink transmission beam based on the uplink reference signals; and in the case that the reception quality of at least one of the downlink reference signals reported by the terminal is superior to all the reception qualities of the uplink reference signals, select to instruct the terminal to obtain the uplink transmission beam based on the downlink reference signals.

18. An apparatus for determining an uplink transmission beam, comprising:
a second memory, a second processor and a program that is stored on the second memory and executable by the second processor, wherein the second processor is configured to execute the program to implement steps of the method for determining an uplink transmission beam according to claim 9.

19. The apparatus according to claim 18, wherein,
in the case that the base station indicates that the uplink transmission beam for the terminal is obtained based on the uplink reference signals, the uplink transmission beam indication information comprises an index of the uplink transmission beam or indication information of the uplink reference signals; or
in the case that the base station indicates that the uplink transmission beam for the terminal is obtained based on the downlink reference signals, the uplink transmission beam indication information comprises an index of a downlink transmission beam, indication information of the downlink reference signals, or indication information of a downlink reception beam.

20. The apparatus according to claim 18, wherein the second processor is configured to:
determine a weight of the uplink transmission beam on the basis of the index of the uplink transmission beam or the indication information of the uplink reference signals, in the case that the uplink transmission beam indication information indicates that the terminal obtains the uplink transmission beam based on the uplink reference signals.

* * * * *